No. 767,577. PATENTED AUG. 16, 1904.
J. LEIGHTON & R. HACKING.
TRAM OR RAILWAY POINT OR SWITCH AND MEANS FOR WORKING SAME.
APPLICATION FILED NOV. 20, 1903.
NO MODEL. 5 SHEETS—SHEET 1.
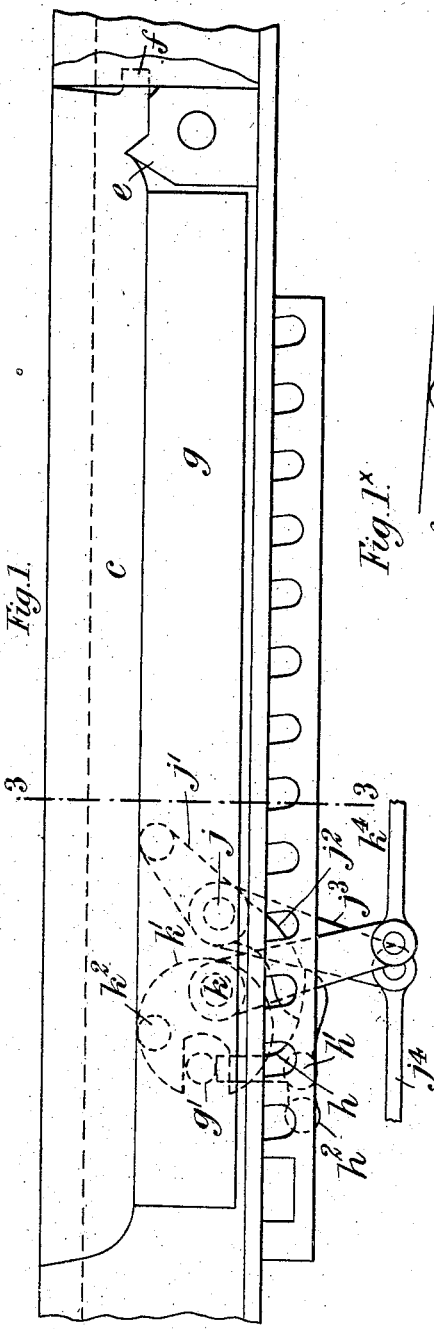
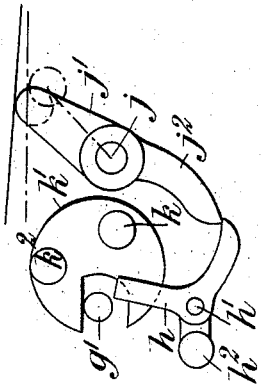
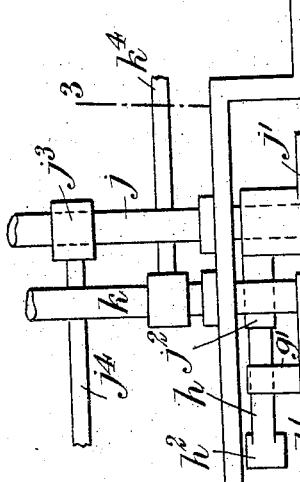
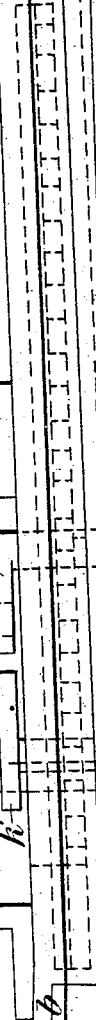
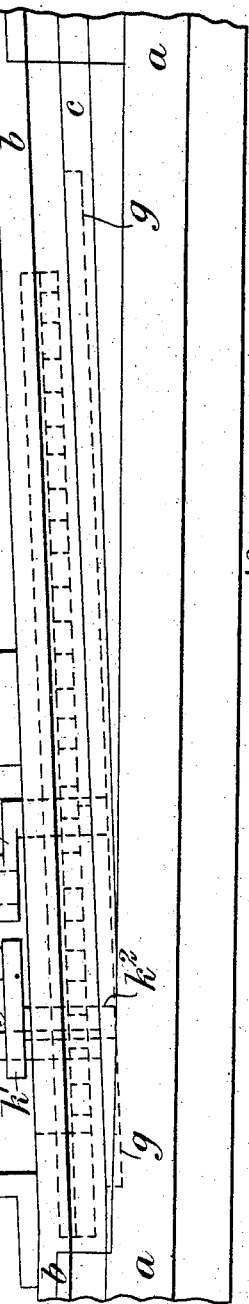
Witnesses
Inventors

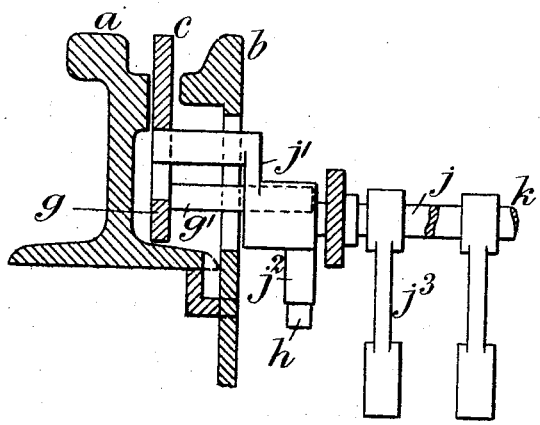
Fig. 3.
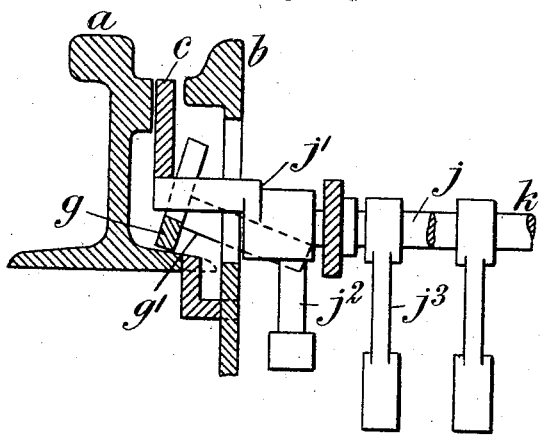
Fig. 3.ˣ

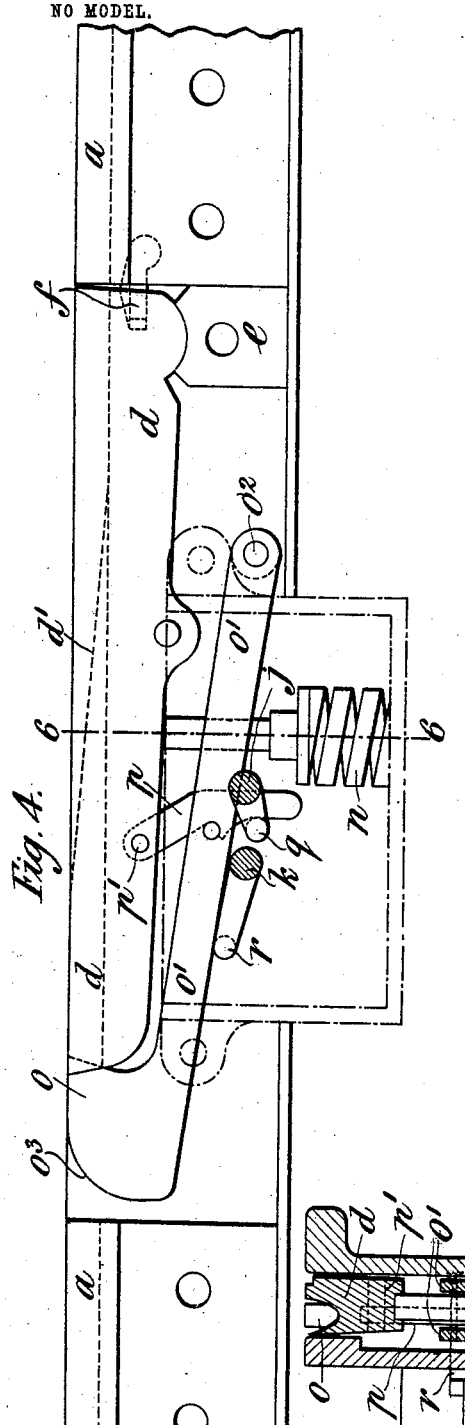
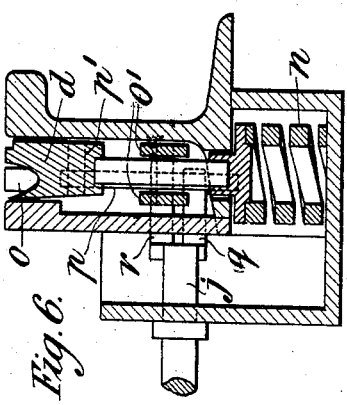
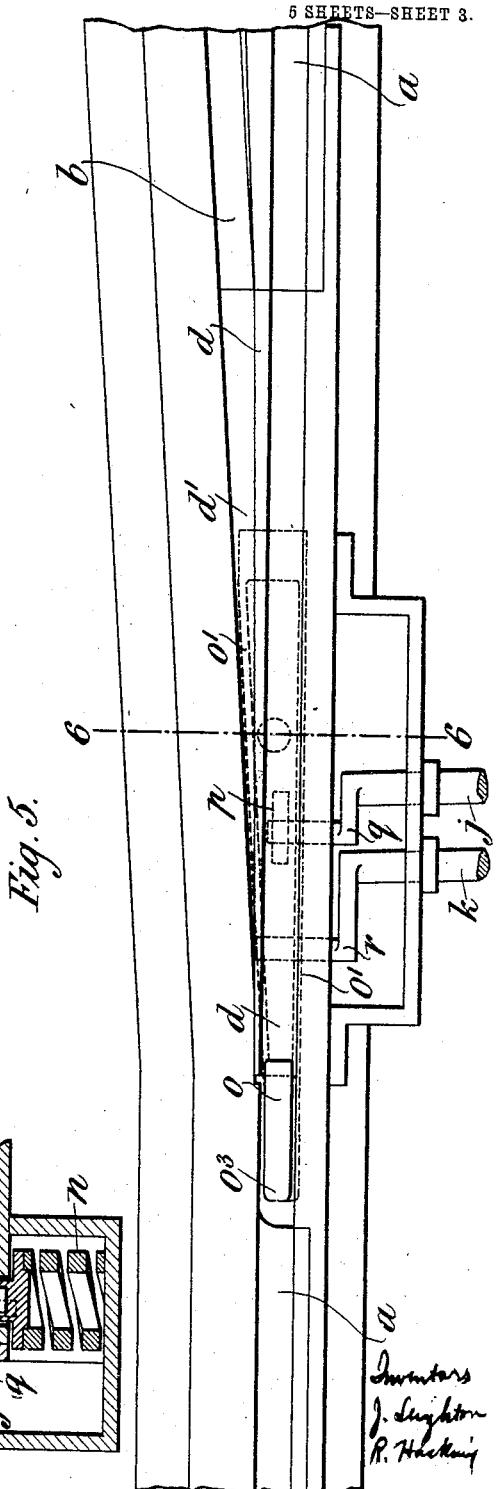

No. 767,577. PATENTED AUG. 16, 1904.
J. LEIGHTON & R. HACKING.
TRAM OR RAILWAY POINT OR SWITCH AND MEANS FOR WORKING SAME.
APPLICATION FILED NOV. 20, 1903.
NO MODEL. 5 SHEETS—SHEET 4.

Witnesses.
Inventors.
J. Leighton R. Hacking

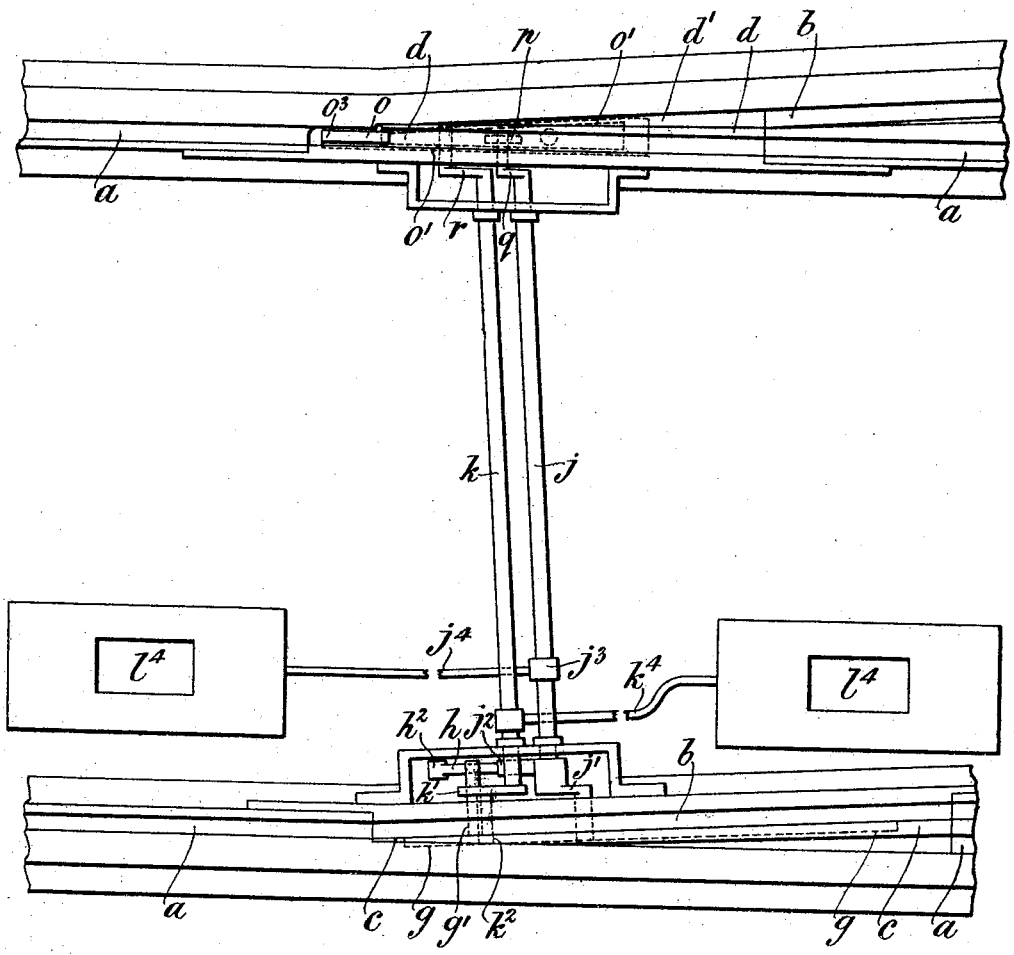

No. 767,577. Patented August 16, 1904.

UNITED STATES PATENT OFFICE.

JOHN LEIGHTON AND ROBERT HACKING, OF NOTTINGHAM, ENGLAND.

TRAM OR RAILWAY POINT OR SWITCH AND MEANS FOR WORKING SAME.

SPECIFICATION forming part of Letters Patent No. 767,577, dated August 16, 1904.

Application filed November 20, 1903. Serial No. 181,984. (No model.)

*To all whom it may concern:*

Be it known that we, JOHN LEIGHTON, manufacturer, residing at Havelock House, Lucknow Road, Nottingham, and ROBERT HACKING, model-maker, residing at Woodland Road, West Bridgeford, Nottingham, England, subjects of the King of Great Britain, have invented certain new and useful Improvements in Tram or Railway Points or Switches and Means for Working the Same, of which the following is a specification.

According to this invention in place of moving the switch-rails sidewise together, as is usual, one of them is dropped out of the way of one wheel, while the other remains stationary and acts on the other wheel.

Figure 7:
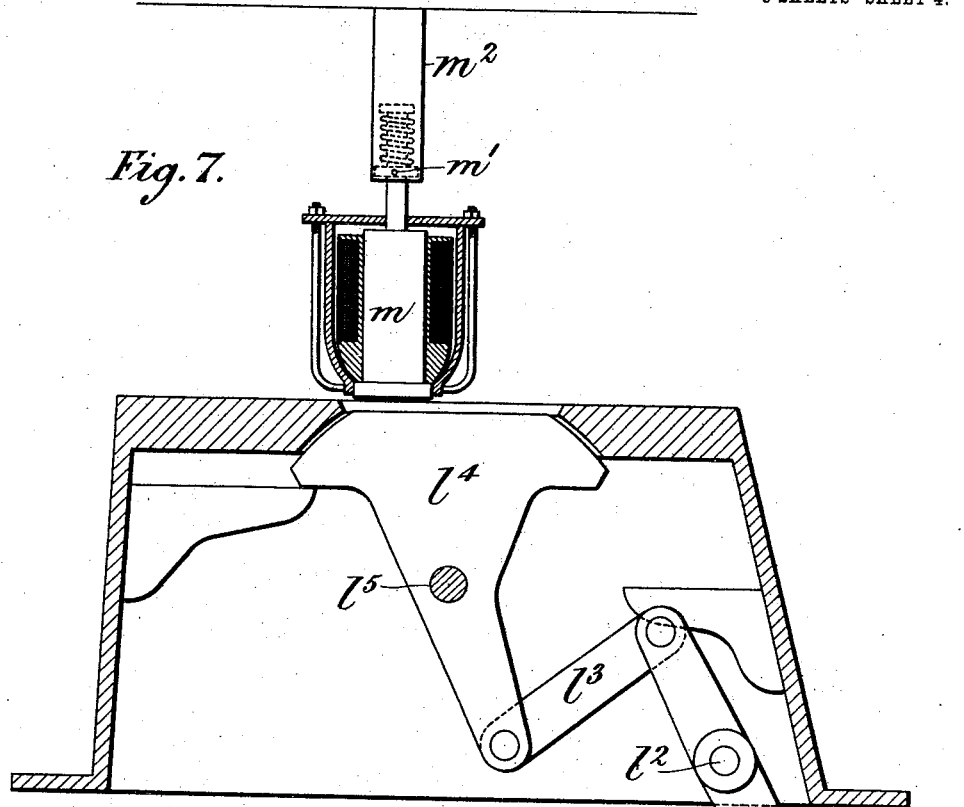
Figure 8:
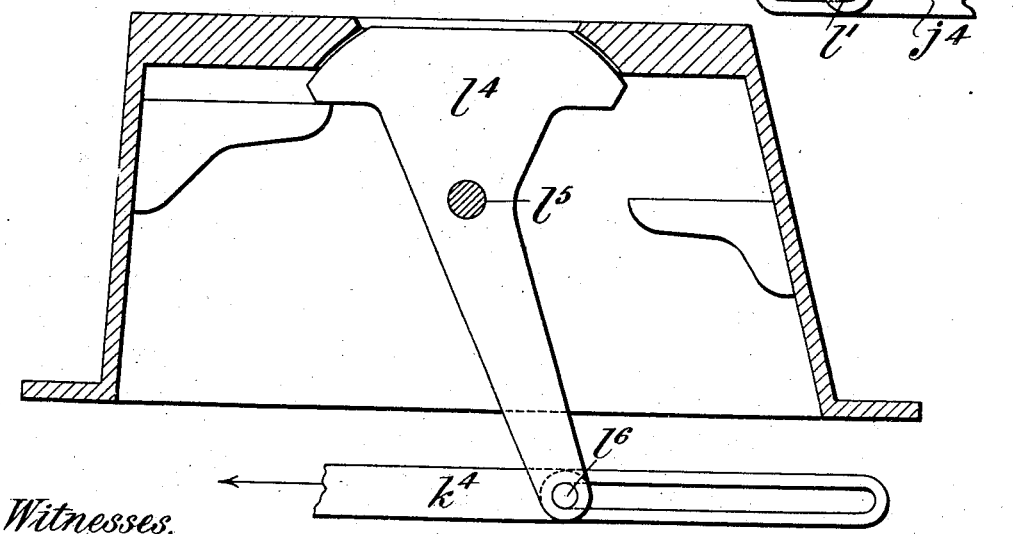

Figure 1 is a side elevation with some parts omitted, and Fig. 2 is a plan showing the preferred method of operating the outer rail of the curve of a branch line. Fig. $1^\times$ is a diagrammatic side elevation showing the parts in a different position to Fig. 1. Figs. 3 and $3^\times$ are sections on the line 3 3, Figs. 1 and 2, with the parts in different positions. Fig. 4 is a side elevation with some parts omitted, and Fig. 5 is a plan showing the preferred method of operating the inner switch-rail of the curve of a branch line. Fig. 6 is a section on the line 6 6, Figs. 4 and 5. Figs. 7 and 8 are side elevations showing a magnetic arrangement for operating the points. Fig. 9 is a plan of the complete arrangement.

In the figures, $a\ a$ are the main-line rails, and $b\ b$ are the branch-line rails.

$c$ and $d$ are respectively the switch-rails on the outer and inner sides of the curve of the branch line and which throughout this specification are termed the "outer" and "inner" switch-rails. In Figs. 1 and 2 these rails are pivoted at one end on knife-edges $e$, and the rails are held down by pins $f$ engaging with notches in webs fixed to their under sides. In Figs. 4 and 5 the knife-edges are replaced by block $e$, and the rails are prevented from rising by pins $f$, which, however, allow them to turn in a vertical plane through a small angle. For the outer rail of the curve we prefer to adopt the arrangement shown at Figs. 1 to $3^\times$. The rail $c$ is supported on a plate $g$, which can tilt sidewise, as shown at Fig. $3^\times$, to allow the rail to drop. The plate is locked in position by means of a bell-crank lever $h$, pivoted at $h'$, one arm of which supports a pin $g'$, fixed to the plate. When it is desired to release the rail $c$, it is first lifted slightly by the arm $j'$, fixed to the shaft $j$, (which is turned as hereinafter described,) thus relieving the plate $g$ from its weight, while at the same time the arm $j^2$, fixed to the shaft $j$, turns the bell-crank lever $h$ into the position shown at Fig. $1^\times$, which allows the plate $g$ to fall into the position shown at Fig. $3^\times$, the rail $c$ also falling as soon as the arm $j'$ ceases to support it. To replace the rail $c$, it is first lifted by the arm $k^2$, fixed to the disk $k'$ on the shaft $k$, (which is turned as hereinafter described,) and the pin $g'$, which passes through a slot in the disk $k'$, is also lifted toward the end of the movement, so turning the plate $g$ into a vertical position beneath the rail. As the rail rises also the weighted arm $j^3$ turns the shaft $j$, thus allowing the counterbalance-weight $h^2$ to turn the bell-crank lever $h$ into its original position, so that it again supports the pin $g'$. The shaft $j$ is turned by the rod $j^4$, pivoted to the arm $j^3$, which passes to a box (shown at Fig. 7) fixed in the roadway at a convenient distance—say twenty feet—to the left of Fig. 1. The end of the rod $j^4$ is slotted and engages with a pin $l'$ on the lever $l$, which is pivoted at $l^2$. The other arm of the lever $l$ is connected by a link $l^3$ to a soft-iron armature $l^4$, pivoted at $l$. As the vehicle passes from the left to the right of Fig. 1 the driver (if he wishes to operate the points so as to continue to go along the main line) lowers the electromagnet $m$, so that as the vehicle passes the armature $l^4$ is turned about its pivot and the pin $l'$ moves along the slot in the rod $j^4$ and during the last part of its travel pushes the rod in the direction of the arrow, thus raising the rail $c$, as above described. When the vehicle has passed, the weight of the rail $c$ forces the armature $l^4$ back into its normal position, Fig. 7. The shaft $k$ is turned in a similar manner by an armature $l^4$, placed in a box, Fig. 8, in the roadway of the main line at a convenient distance—say twenty feet—to the right of Fig. 1. In this case the lever $l$ is dispensed with, a pin $l^6$ on the armature $l^4$ working in a slot in the rod $k^4$. In all other respects the arrangement is similar to that above described and requires no further description. The magnet $m$ is mounted on trunnions $m'$ on the hanger $m^2$, and the latter can be raised and lowered by the driver.

The above-described arrangement may be employed for the inner rail of the curve; but we prefer to adopt that shown at Figs. 4 to 6.

The rail $d$ is supported by a spring $n$. The groove in front of the nose of the rail is normally filled by a block $o$, carried by a lever $o'$, pivoted at $o^2$ beneath the rail. This lever is held up by a pawl $p$, pivoted at $p'$ to the under side of the rail $d$, so that the block and rail, which have suitable inclines $o^3$ and $d'$ upon them, are pressed down together by the wheel as it passes to or from the branch line $b$ and are raised up again by the spring $n$ after the wheel has passed. When, however, the vehicle is going along the main line, the pawl $p$ is tripped by an arm $q$, fixed to the above-described shaft $j$, which extends across the line, whereupon the lever $o'$ and block $o$ fall by their own weight, thus clearing the groove of the rail. After the wheel has passed the points the lever $o'$ is again raised into engagement with the pawl by an arm $r$, fixed to the shaft $k$. In going either to or from the branch line $b$ the driver does not lower the magnet $m$, because, as shown in Fig. 2, the outer switch-rail is normally set so as to guide the outer wheels of the vehicle to and from the branch line, while the inner wheels simply press down the rail $d$ and block $o$ against the spring $n$. If, however, the vehicle is going from left to right along the main line, the driver lowers the magnet and successively turns the armatures $l^4$, above described.

What we claim is—

1. The combination of a switch-rail, a pivot about which it can turn in a vertical plane, a movable plate supporting the rail when it is in its normal position and means for raising the rail off the plate.

2. The combination of a switch-rail, a pivot about which it can turn in a vertical plane, a plate free to turn about its lower edge supporting the rail, means for retaining the plate in a vertical position and for releasing it, means for raising the rail, and means for raising the plate to a vertical position.

3. The combination of an outer switch-rail, a pivot about which it can turn in a vertical plane, means for supporting and raising the rail, an inner switch-rail, a pivot about which it can turn in a vertical plane, a spring supporting and raising the inner rail, a block at one end of it and means for supporting and raising the block.

4. The combination of an outer switch-rail, a pivot about which it can turn in a vertical plane, a movable plate supporting the rail, means for raising the rail, an inner switch-rail, a pivot about which it can turn in a vertical plane, a spring supporting and raising the inner rail, a block at one end of it and means for supporting and raising the block.

5. The combination of an outer switch-rail, a pivot about which it can turn in a vertical plane, means for supporting and raising the rail, an inner switch-rail, a pivot about which it can turn in a vertical plane, a spring supporting and raising the inner rail, a block at one end of it, a lever carrying the block, a pawl pivoted to the rail and supporting the lever and means for raising the lever.

6. The combination of an outer switch-rail, a pivot about which it can turn in a vertical plane, a movable plate supporting the rail, means for raising the rail, an inner switch-rail, a pivot about which it can turn in a vertical plane, a spring supporting and raising the inner rail, a block at one end of it, a lever carrying the block, a pawl pivoted to the rail and supporting the lever and means for raising the lever.

7. The combination of a switch-rail, a pivot about which it can turn in a vertical plane, means for supporting the rail, a pivoted armature and mechanism connecting the armature and the rail in such manner that when the armature is turned one end of the rail is raised.

8. The combination of a switch-rail, a pivot about which it can turn in a vertical plane, a plate free to turn about its lower edge supporting the rail, a shaft, a disk fixed to the shaft and having a notch in it, a pin fixed to the plate and engaging with the notch, a pin fixed to the disk and bearing against the under side of the rail and means for turning the shaft.

9. The combination of a switch-rail, a pivot about which it can turn in a vertical plane, a plate free to turn about its lower edge supporting the rail, a shaft, a disk fixed to the shaft and having a notch in it, a pin fixed to the plate and engaging with the notch, a pin fixed to the disk and bearing against the under side of the rail, a pivoted armature and mechanism connecting the armature and shaft in such manner that they turn together.

10. The combination of a switch-rail, a pivot about which it can turn in a vertical plane, a plate free to turn about its lower edge supporting the rail, a shaft, a disk fixed to the shaft and having a notch in it, a pin fixed to the plate and engaging with the notch, a pin fixed to the disk and bearing against the under side of the rail, a second shaft, an arm fixed to it and bearing against the under side of the rail, a second arm fixed to it, a bell-crank lever one arm of which engages with the second arm and the other with the pin on the plate and means for turning the shafts.

11. The combination of a switch-rail, a pivot about which it can turn in a vertical plane, a plate free to turn about its lower edge supporting the rail, a shaft, a disk fixed to the shaft and having a notch in it, a pin fixed to the plate and engaging with the notch, a pin fixed to the disk and bearing against the under side of the rail, a second shaft, an arm fixed to it and bearing against the under side of the rail, a second arm fixed to it, a bell-crank lever one arm of which engages with the second arm and the other with the pin on the plate, a pair of pivoted armatures and mechanism connecting the armatures to the shafts in such manner that when each armature is turned one of the shafts turns with it.

12. The combination of a switch-rail, a pivot about which it can turn in a vertical plane, a plate free to turn about its lower edge supporting the rail, a shaft, a disk fixed to the shaft and having a notch in it, a pin fixed to the plate and engaging with the notch, a pin fixed to the disk and bearing against the under side of the rail, a second shaft, an arm fixed to it and bearing against the under side of the rail, a second arm fixed to it, a bell-crank lever one arm of which engages with the second arm and the other with the pin on the plate, an inner switch-rail, a pivot about which it can turn in a vertical plane, a spring supporting and raising the inner rail, a block at one end of it, a lever carrying the block, a pawl pivoted to the rail and supporting the lever, a third arm fixed to the second shaft and engaging with the pawl, an arm fixed to the first shaft and engaging with the lever and means for turning the shafts.

13. The combination of a switch-rail, a pivot about which it can turn in a vertical plane, a plate free to turn about its lower edge supporting the rail, a shaft, a disk fixed to the shaft and having a notch in it, a pin fixed to the plate and engaging with the notch, a pin fixed to the disk and bearing against the under side of the rail, a second shaft, an arm fixed to it and bearing against the under side of the rail, a second arm fixed to it, a bell-crank lever one arm of which engages with the second arm and the other with the pin on the plate, an inner switch-rail, a pivot about which it can turn in a vertical plane, a spring supporting and raising the inner rail, a block at one end of it, a lever carrying the block, a pawl pivoted to the rail and supporting the lever, a third arm fixed to the second shaft and engaging with the pawl, an arm fixed to the first shaft and engaging with the lever, a pair of pivoted armatures and mechanism connecting the armatures to the shafts in such manner that when each armature is turned one of the shafts turns with it.

JOHN LEIGHTON.
ROBERT HACKING.

Witnesses:
THOS. H. COOK,
ERNEST MORAN.